United States Patent [19]
Motozono et al.

[11] Patent Number: 5,882,701
[45] Date of Patent: *Mar. 16, 1999

[54] POULTRY EGG WITH IMPROVED FLAVOR AND METHOD OF PRODUCING

[75] Inventors: Yukihiro Motozono, Nasu-gun; Shuging Li, Otaru; Noboru Ishihara, Tokyo; Nobuyuki Arai, Nasu-gun; Ryozo Nakahara, Toyonaka; Yoshihiro Kochi, Kusatsu; Sachiko Tanaka, Takatsuki; Akiko Kami, Toyonaka, all of Japan

[73] Assignees: Nisshin Flour Milling Co., Ltd., Tokyo; Kaneka Corporation, Osaka, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 701,498

[22] Filed: Aug. 1, 1996

[30] Foreign Application Priority Data

Aug. 2, 1995 [JP] Japan ..................................... 7-197430

[51] Int. Cl.⁶ ................................ A23K 1/24; A23L 1/32
[52] U.S. Cl. ................................ 426/2; 426/614; 426/807
[58] Field of Search ................................ 426/614, 2, 651, 426/807, 568, 534, 638

[56] References Cited

U.S. PATENT DOCUMENTS

| | | | |
|---|---|---|---|
| 4,880,639 | 11/1989 | Lauermann et al. | 426/2 |
| 5,478,585 | 12/1995 | Isono et al. | 426/417 |
| 5,494,695 | 2/1996 | Inayoshi et al. | 426/573 |
| 5,741,508 | 4/1998 | Katsumi et al. | 426/2 X |

OTHER PUBLICATIONS

Katsuni et al JP40–7079709 (Mar. 1995) Abstracted from JPO Abstracts.

Doi et al JP40–6014723 (Jan. 1994) Abstracted from JPO Abstracts.

Funa et al Fenaroli's handbook of Flavor Ingredients (1971) pp. 16–25, 84–85, 173–174, 329, 644, 673–674.

Rombuer et al Joy of Cooking (1975) pp. 363, 734–737.

*Primary Examiner*—Arthur L. Corbin
*Attorney, Agent, or Firm*—Sughrue, Mion, Zinn, Macpeak & Seas, PLLC

[57] ABSTRACT

In a method for producing eggs with improved flavor, hen poultry are fed a feed containing nutmeg and/or cinnamon. Eggs obtained from the poultry and foods produced from the eggs have an improved taste.

4 Claims, No Drawings

POULTRY EGG WITH IMPROVED FLAVOR AND METHOD OF PRODUCING

BACKGROUND OF THE INVENTION

1. Field of the Invention

The present invention relates to a poultry egg which has improved flavor (hereinafter referred to as flavor-improved poultry egg), a method for producing the egg, and foods which are manufactured by the use of the flavor-improved poultry egg.

2. Description of the Related Art

Poultry eggs are of high nutritive value. Nonetheless, their prices have remained low for long periods. Therefore, producers of poultry eggs have pursued economization and have continued searching for inexpensive raw materials for manufacturing feed. As a result, the quality and taste of poultry eggs have been degraded. Feeds for poultry for producing eggs are manufactured using corn, milo, soybean meal, rapeseed meal, fish meal, oils and fats, etc. as starting materials. Particularly when hens are raised with feeds manufactured from fish meal or other starting materials originating from fish, there has been a problem that the resulting eggs tend to have a fishy smell or taste. On the other hand, presumably reflecting consumers' keen interest in healthy foods in recent years, special eggs laid by hens raised with feeds enriched with eicosa-pentaenoic acid (EPA), docosa-hexaenoic acid (DHA), vitamins, etc. are on the market. These eggs, however, also are not free from the problem of having a fishy smell. Presently, the fishy smell of poultry eggs have not yet been completely solved.

Accordingly, reduction or elimination of the fishy smell attributed to starting materials of poultry eggs is desired to thereby improve their flavor.

The present inventors conducted careful studies to solve the above problem and found that hens fed with feeds containing specified natural spices lay eggs having a greatly reduced fishy smell which conventional poultry eggs cannot avoid, and that the eggs laid by the hens fed with such feeds have a rich flavor.

Techniques for adding natural spices to feeds for poultry have been disclosed in Japanese Patent Application Laid-Open (kokai) Nos. 5-276878, 6-14723, 7-31382, and 7-79709, for example. In these publications, it is reported that when poultry raised exclusively for the purpose of producing meat (hereinafter simply referred to as meat poultry) are fed a feed containing natural spices, the resulting meat has a reduced fat content and a less greasy taste, a reduced meaty smell which improves its flavor, and a longer shelf life.

However, the techniques disclosed in those publications are exclusively directed to alteration of the properties of chicken meat by feeding natural spices to hens; the issue of whether or not feeding of natural spices affects the flavor of poultry eggs is not investigated. In particular, Japanese Patent Application Laid-Open (kokai) No. 6-14723 discloses a method for raising meat poultry by feeding them feed containing garlic, ginger, oregano, and cinnamon. However, it has been found that eggs laid by poultry hens fed with feed containing garlic have a poor flavor.

Japanese Patent Application Laid-Open (kokai) No. 6-253749 discloses a method for imparting flavor to poultry eggs by feeding poultry hens with an oily flavor essence dissolved in an organic solvent, and U.S. Pat. No. 4,880,639 discloses a method for imparting flavor to poultry eggs by feeding hens with essential oils of natural spices. However, incorporation of oily flavor essences or essential oils into feeds is disadvantageous in that the flavor is not satisfactorily transferred to poultry eggs, and in addition, the flavor is reduced during storage.

SUMMARY OF THE INVENTION

Under the above circumstances, the present inventors unexpectedly found that poultry hens fed with feed containing nutmeg and/or cinnamon lay eggs imparted with a remarkably improved flavor, leading to completion of the invention.

Accordingly, an object of the present invention is to provide a method for producing a flavor-improved poultry egg, in which poultry are fed with feed containing nutmeg and/or cinnamon.

Another object of the present invention is to provide a flavor-improved poultry egg produced by poultry which is fed with a feed containing nutmeg and/or cinnamon.

Still another object of the present invention is to provide foods manufactured from the flavor-improved poultry egg described above.

These and other objects, features, and advantages of the present invention will become apparent from the following description.

DESCRIPTION OF PREFERRED EMBODIMENTS

The feed for poultry raised for laying eggs (hereinafter simply referred to as egg poultry) according to the present invention contains nutmeg and/or cinnamon. They may be incorporated into feed in various forms. For example, whole nutmeg or whole cinnamon may be used in forms in which they are collected from trees, or they may be used after drying or pulverizing. Alternatively, they may be incorporated into feed after being formed into pellets with or without use of a vehicle. However, essential oils extracted from nutmeg or cinnamon are not preferred in the present invention as they are unstable when incorporated into feed and fail to provide sufficient effects of the present invention.

When nutmeg and/or cinnamon is incorporated in feed for egg poultry, the amount incorporated varies depending on the manner of use, type and age of poultry which are to be fed, flavor desired for the eggs, use of the eggs, etc. It is preferred that the amount be between 1 and 6% by weight (hereinafter referred to as %) of feed on a dry basis. If the amount of nutmeg and/or cinnamon contained in feed is not more than 1%, the improvement in flavor of eggs laid by the poultry fed with such a feed is not satisfactory, whereas if 6% or greater amounts of nutmeg and/or cinnamon are incorporated, the flavor-improving effect saturates and no further flavor-improving effect is obtained. Moreover, such a high amount is not preferred from the standpoint of nutritional balance.

When nutmeg and/or cinnamon is incorporated into feed, it may be blended simultaneously with other raw materials. Considering that the amount of nutmeg and/or cinnamon is small, it is preferred that nutmeg and/or cinnamon be first blended with a portion of starting materials of feed to prepare a feed additive, which is then added to the remaining starting materials of feed. This allows uniform blending of nutmeg and/or cinnamon.

The starting materials of feed to which nutmeg and/or cinnamon are added are not particularly limited. Customary starting materials selected based on the species of poultry, age, flavor desired for the eggs which are laid by the poultry, etc. are suitable. Examples of such starting materials include grains such as corn, milo, soybean, and wheat; oil meal such as soybean oil meal and cotton seed oil cake; animal oils and fats such as meat meal, chicken meal, lard, and beef tallow; calcium carbonate; salt; silicic anhydride; vitamins; minerals; and amino acids. The feed for feeding egg poultry according to the present invention is manufactured by blending these starting materials together with nutmeg and/or cinnamon and forming pellets, mush, or crumbles.

The method of feeding egg poultry the thus-manufactured feed of the present invention is not particularly limited, and ordinary methods may be used. In order to maximize the effect of the present invention, it is preferred that feeding with the feed of the invention be continued from around 14 days before laying eggs to the last term of laying eggs.

In the present invention, the species of poultry to be fed with the above-described feed is not particularly limited as long as it is in the category of egg poultry. Examples of the poultry include, but are not limited to, chickens, Japanese quail, silky fowls, and ducks. Among these, chickens are preferred.

Eggs which are laid by poultry hens raised according to the method of the present invention have a sufficiently improved flavor when cooked by a conventional method. Since the eggs according to the present invention do not have a disagreeable odor, they are advantageously used for the manufacture of foods whose quality is greatly affected by their flavors, including "mushi-tamago" (steamed egg), custard cream, custard pudding, and mayonnaise.

The mechanism of improving the flavor of eggs by nutmeg and/or cinnamon has not been completely elucidated. It is considered that when nutmeg and/or cinnamon is ingested by egg poultry, the active ingredients of nutmeg and/or cinnamon are transferred into the egg, mainly into the fat of the yolk, because the active ingredients are oil-affinity, thereby improving the flavor of the egg.

The present invention will next be described by way of examples, which should not be construed as limiting the invention.

EXAMPLES 1 and 2

Egg poultry were raised by feeding with nutmeg-added feed, cinnamon-added feed, or ordinary feed. Yield of eggs and Haugh units were obtained. Also, a sensory test was performed in terms of the flavor of the eggs.

(1) Preparation of feed

Example 1: base feed plus 2% by weight of crushed nutmeg,

Example 2: base feed plus 2% by weight of crushed cinnamon,

Comparative Example 1: base feed only

TABLE 1

| Raw materials | Proportion (wt. %) |
| --- | --- |
| Corn | 56.28 |
| Milo | 5.0 |
| Soybean meal | 19.0 |
| Yellow gluten meal | 3.0 |
| Fish meal | 3.0 |
| Yellow grease (YG) | 2.5 |
| Calcium carbonate | 9.7 |
| Calcium triphosphate | 1.2 |
| Salt | 0.15 |
| Mixture of vitamins and minerals | 0.17 |

(2) Method of raising

Forty-five (45) Laying hens (Decalb TX-35, 362 days old) were divided into 3 groups of cages, each group containing 15 hens with one hen in each cage. Hens in the three groups were fed with feeds of Examples 1, 2, and Comparative Example 1, respectively for 3 weeks before eggs were collected. Table 2 shows the yield of eggs laid in each group during a three-week period from the start of the test. Table 3 shows the Haugh units of eggs laid by hens during a three-week period from the start of the test. As a result, there was found to be no significant difference between groups with respect to the yield of eggs and the Haugh units.

TABLE 2

| | Egg production (%) | Av. Egg weight (g) | Egg mass (g/hen/day) | Feed intake (g/hen/day) | Feed conversion ratio |
| --- | --- | --- | --- | --- | --- |
| Comp. Ex. 1 | 76.8 | 61.0 | 46.9 | 94.8 | 2.02 |
| Ex. 1 | 74.2 | 61.7 | 45.8 | 94.6 | 2.07 |
| Ex. 2 | 74.3 | 61.8 | 45.9 | 94.8 | 2.07 |

TABLE 3

| | No. of eggs tested | Haugh units |
| --- | --- | --- |
| Comp. Ex. 1 | 14 | 71.3 ± 6.5 |
| Ex. 1 | 14 | 72.5 ± 6.2 |
| Ex. 2 | 15 | 70.4 ± 5.9 |

(3) Sensory test of eggs

Eggs collected from the hens raised in the above-described method were compared in terms of their flavor. Evaluation was made by way of sensory testing after each egg was cooked into "mushi-tamago" (steamed egg), custard pudding, custard cream, or mayonnaise. Assessment by ranking in the sensory testing of custard pudding, custard cream, or mayonnaise was performed in accordance with the test of concordance of Kenda 11 [Zenjiro Kurita, "Sensory Test Handbook", published by JUSE [UNION OF JAPANESE SCIENTISTS AND ENGINEERS], pp. 297–306].

(a) "Mushi-tamago" (Steamed egg)

Method of preparation:

1) Combine equal amounts of water and egg, and whip.

2) Add salt in amounts of 0.1% with respect to the total amount of the results of 1), and mix well.

3) Strain the results of 2) through a strainer to remove chalazas, etc.

4) Transfer the results of 3) to a casserole, place the casserole in a steamer, and cook by steaming for about 15 minutes at low heat until the contents have become as hard as custard pudding.

Results of sensory testing:

Ten (10) panelists evaluated and ranked the eggs in terms of odor and taste, and a test of concordance was performed (concordance coefficient: 0.3700). Results showed that a disagreeable odor was weakest in Example 1, moderate in Example 2, and strongest in Comparative Example 1. The difference was considered to be significant at the level of significance being 5%. Also, the eggs in Example 1 had a rich flavor compared with those of Comparative Example 1. The eggs in Example 2 had a much lower disagreeable smell inherent to chicken eggs compared with those of Comparative Example 1, and their taste was light and agreeable.

(b) Custard pudding

Method of preparation:

Materials: egg (100 g), sugar (30 g), and milk (200 g)

1) Thinly coat the inside wall of a pudding mold with butter.
2) Mix milk and sugar, and warm the mixture on a kitchen stove so that the sugar melts (50°–60° C.).
3) Add the results of 2) to a stirred egg liquid, and strain the resultant mixture through a strainer to remove chalazas, etc.
4) Transfer the results of 3) to the mold, place the mold in a steamer, and cook by steaming for about 15–20 minutes at low heat.

Results of sensory testing:

Nine (9) panelists evaluated and ranked the eggs in terms of odor and taste, and a test of concordance was performed (concordance coefficient: 0.3383). Results showed that a disagreeable odor was weakest in Example 2, moderate in Example 1, and strongest in Comparative Example 1. The difference was considered to be significant at the level of significance being 5%. The eggs in Example 1 had a rich flavor compared with those of Comparative Example 1. Particularly, a stronger sweetness was sensed. Eggs in Example 2 had a light but rich flavor, and yielded an impressive milk-like flavor without any disagreeable persistence.

(c) Custard cream

Method of preparation:

Materials: milk (500 g), granulated sugar (130 g), cornstarch (18 g), soft flour (17 g), and egg yolk (90 g)

1) Place granulated sugar and yolk into a pan and mix until a white mixture is obtained.
2) Add a small amount of milk to the results of 1) and mix well.
3) Add sifted cornstarch and flour to the results of 2) and mix.
4) Heat milk to about 40° C. and slowly add to the results of 3) so as not to produce lumps.
5) Cook the results of 4) at low heat while stirring until the mixture becomes pasty.

Results of sensory testing:

Eleven (11) panelists evaluated and ranked the eggs in terms of odor and taste, and a test of concordance was performed (concordance coefficient: 0.0406). Results showed that a disagreeable odor was weakest in Example 2, moderate in Example 1, and strongest in Comparative Example 1. The difference was considered to be significant at the level of significance being 5%. The eggs in Example 1 had a much lower disagreeable smell inherent to chicken eggs compared with those of Comparative Example 1 but gave rich flavor and had a stronger sweetness which did not leave any disagreeable aftertaste. The eggs in Example 2 had no negative feature in terms of odor and flavor, gave a light flavor, and had long-lasting sweetness which was nevertheless not excessively persistent.

(d) Mayonnaise

Method of preparation:

Materials: vegetable oil (75 g), egg yolk (15 g), vinegar (10 g), salt (2 g), and sugar (1 g)

1) Add salt and sugar to egg yolk and mix well.
2) Add vegetable oil to the results of 1) little by little and stir.
3) When the mixture becomes pasty, adjust the viscosity by adding vinegar.

Results of sensory testing:

Nine (9) panelists evaluated and ranked the eggs in terms of odor and taste, and a test of concordance was performed (concordance coefficient: 0.1440). Results showed that a disagreeable odor was weakest in Example 2, moderate in Example 1, and strongest in Comparative Example 1. The difference was considered to be significant at the level of significance being 5%. The eggs in Example 1 had a slightly stronger odor as compared with the eggs in Comparative Example 1, but had a rich flavor. Eggs in Example 2 gave no disagreeable odor inherent to chicken eggs and the mayonnaises made from these eggs were evaluated as having a good flavor.

EXAMPLE 3

Egg poultry were raised by feeding them with feed containing crushed cinnamon, feed containing essential oil of cinnamon, or ordinary feed. Yield of eggs and the cinnamaldehyde content in the yolk of eggs were determined. Also, a sensory test of the flavor of the eggs was performed.

(1) Preparation of feed

Example 3: base feed plus 2% by weight of crushed cinnamon (cinnamaldehyde content)=650 mg/100 g), Comparative Example 2: base feed plus 0.02% by weight of cinnamon essential oil (cinnamaldehyde content=66,000 mg/100 g), Comparative Example 3: base feed only (2) Method of raising Forty-five (45) Laying hens (Decalb TX-35, 350 days old) were divided into 3 groups of cages, each group containing 15 hens with one hen in each cage. Hens in the three groups were fed with feeds of Example 3 and Comparative Examples 2 and 3, respectively for 4 weeks before eggs were collected. Table 4 shows the yield of eggs laid by hens in each group during a four-week period from the start of the test. Four (4) weeks after the test started, 10 eggs were randomly selected among the eggs freshly laid in each group. The yolks of the eggs collected in each group were mixed and the cinnamaldehyde content was determined. The results are shown in Table 4.

TABLE 4

|  | Egg production (%) | Av. Egg weight (g) | Egg mass (g/hen/day) | Feed intake (g/hen/day) | Feed conversion ratio | Cinnamaldehyde content |
| --- | --- | --- | --- | --- | --- | --- |
| Ex. 3 | 77.8 | 61.8 | 48.1 | 105.0 | 2.18 | 0.06 ppm |
| Comp. Ex. 2 | 78.3 | 61.3 | 48.0 | 104.0 | 2.17 | 0.02 ppm |
| Comp. Ex. 3 | 78.5 | 61.5 | 48.3 | 103.0 | 2.13 | not detected |

(3) Sensory test of eggs

Eggs collected from the hens raised in the above-described method were compared in terms of their flavor. Evaluation was made by way of sensory testing after custard cream was prepared from the eggs in the same manner described in Example 1. Assessment by ranking was performed by the method described in Example 1.

Results of sensory testing:

Eggs from Example 3 and Comparative Example 2 had a lighter flavor and distinguished sweetness as compared to those from Comparative Example 3. In particular, eggs from Example 3 had no disagreeable taste and gave a soft flavor, whereas eggs from Comparative Example 2 did have a sweet flavor but were slightly stimulating to the tongue. When twelve (12) panelists evaluated and ranked the eggs, the ranking was the highest for eggs from Example 3, intermediate for those from Comparative Example 2, and lowest for those from Comparative Example 3 (concordance coefficient: 0.2708). The difference was considered to be significant at the level of significance being 5%.

REFERENCE EXAMPLE 1

The feeds used in Example 3 and Comparative Example 2 were stored in a henhouse at a temperature between 16° and 25° C. The cinnamaldehyde content in each feed was measured as a function of time. The results are shown in Table 5. As is apparent from Table 5, the feed used in Example 3 was stable over time, whereas that used in Comparative Example 2 was not stable, resulting in a significant decrease in the cinnamaldehyde content over time.

TABLE 5

| | (mg/100 g) | | |
|---|---|---|---|
| | Initial value | After 2 weeks | After 4 weeks |
| Ex. 3 | 13.0 (100) | 12.2 (94) | 11.4 (88) |
| Comp. Ex. 2 | 13.2 (100) | 9.9 (75) | 7.0 (53) |

The values in parentheses represent relative values when an initial value is taken as 100.

EXAMPLES 4–6

Egg poultry were raised by feeding them with feed containing crushed nutmeg and/or crushed cinnamon, feed containing crushed garlic, or ordinary feed. Yield of eggs was determined. Also, a sensory test of the flavor of the eggs was performed.

(1) Preparation of feed

Example 4: same as in Example 2

Example 5: same as in Example 1

Example 6: base feed plus 1% by weight of crushed cinnamon and 1% by weight of crushed nutmeg Comparative Example 4: base feed plus 2% by weight of crushed garlic Comparative Example 5: base feed only (2) Method of raising Seventy-five (75) Laying hens (Decalb TX-35, 325 days old) were divided into 5 groups of cages, each group containing 15 hens with one hen in each cage. Hens in the five groups were fed with feeds of Examples 4 through 6 and Comparative Examples 4 and 5, respectively for 4 weeks before eggs were collected. Table 6 shows the yield of eggs laid by hens in each group during a four-week period from the start of the test. There was no significant difference in yield of eggs between the groups.

TABLE 6

| | Egg production (%) | Av. Egg weight (g) | Egg mass (g/hen/day) | Feed intake (g/hen/day) | Feed conversion ratio |
|---|---|---|---|---|---|
| Ex. 4 | 80.5 | 61.5 | 49.5 | 105.0 | 2.12 |
| Ex. 5 | 79.5 | 62.0 | 49.3 | 104.0 | 2.11 |
| Ex. 6 | 81.5 | 61.3 | 50.0 | 106.0 | 2.12 |
| Comp. Ex. 4 | 79.3 | 61.9 | 49.1 | 105.0 | 2.13 |
| Comp. Ex. 5 | 79.5 | 61.5 | 48.9 | 104.0 | 2.13 |

(3) Sensory test of eggs

Eggs collected from the hens raised in the above-described method were compared in terms of their flavor. Evaluation was made by way of sensory testing on raw eggs and on custard creams prepared from the eggs in the same manner described in Example 1. Assessment by ranking in the sensory testing was performed as described in Example 1.

(a) Raw eggs

Thirteen (13) panelists evaluated and ranked the eggs in terms of odor and taste, and a test of concordance was performed (concordance coefficient: 0.2615). Results showed that a disagreeable odor was weakest in Example 5, increasing from Example 6, Example 4, and Comparative Example 5 in this order, and was strongest in Comparative Example 4. The difference was considered to be significant at the level of significance being 1%. The eggs in Example 4 had a soft flavor and light taste, whereas the eggs in Example 5 had a rich flavor and a pleasant taste, thus being ranked highest. The eggs in Example 6 had a strong flavor and no disagreeable persistent taste. The eggs in Comparative example 4 had a peculiar disagreeable odor, and the eggs in Comparative Example 5 had no disagreeable persistent taste but had a peculiar disagreeable odor.

(b) Custard cream

Thirteen (13) panelists evaluated and ranked the eggs in terms of odor and taste, and a test of concordance was performed (concordance coefficient: 0.2130). Results showed that a disagreeable odor was weakest in Example 4, increasing from Example 6, Example 5, and Comparative Example 5 in this order, and was strongest in Comparative Example 4. The difference was considered to be significant at the level of significance being 5%. The eggs in Example 4 had an agreeable flavor which brought the sweetness of the custard cream into prominence. The eggs in Example 5 had a rich flavor and a body in taste. The eggs in Example 6 gave a somewhat light sensation but also had an adequate degree of rich flavor and taste. The eggs in Comparative Example 4 had a slightly disagreeable flavor and taste, and the eggs in Comparative Example 5 had a slightly disagreeable odor.

What is claimed is:

1. A method for producing a poultry egg with improved flavor, comprising feeding egg-producing poultry an egg-producing poultry feed containing powdered nutmeg and/or powdered cinnamon, and obtaining a poultry egg produced by the thus fed poultry.

2. A poultry egg with improved flavor produced by egg-producing poultry which is fed with an egg-producing poultry feed containing powdered nutmeg and/or powdered cinnamon.

3. A food manufactured from the poultry egg of claim 2.

4. A food according to claim 3, wherein said food is selected from the group consisting of steamed egg, custard cream, custard pudding, and mayonnaise.

* * * * *

UNITED STATES PATENT AND TRADEMARK OFFICE
CERTIFICATE OF CORRECTION

PATENT NO. : 5,882,701
DATED : Mar. 16, 1999
INVENTOR(S) : Yukihiro Motozono, et al It is certified that error appears in the above-identified patent and that said Letters Patent is hereby corrected as shown below:

On title page, item [75] "Shuging Li" should read –Shuqing Li--

Signed and Sealed this

Twenty-seventh Day of July, 1999

*Attest:*

Q. TODD DICKINSON

*Attesting Officer*    *Acting Commissioner of Patents and Trademarks*